United States Patent
Finkelstein et al.

(10) Patent No.: US 7,627,768 B2
(45) Date of Patent: Dec. 1, 2009

(54) METHOD AND DEVICE FOR AUTOMATIC VALIDATION OF COMPUTER PROGRAM USING CRYPTOGRAPHY FUNCTIONS

(75) Inventors: Vincent Finkelstein, Argenteuil (FR); Fabrice Elisabeth, Nanterre (FR)

(73) Assignee: Oberthur Card Systems SA, Paris (FR)

( * ) Notice: Subject to any disclaimer, the term of this patent is extended or adjusted under 35 U.S.C. 154(b) by 920 days.

(21) Appl. No.: 10/509,067

(22) PCT Filed: Mar. 18, 2003

(86) PCT No.: PCT/FR03/00858

§ 371 (c)(1),
(2), (4) Date: May 18, 2005

(87) PCT Pub. No.: WO03/081546

PCT Pub. Date: Oct. 2, 2003

(65) Prior Publication Data

US 2005/0207572 A1   Sep. 22, 2005

(30) Foreign Application Priority Data

Mar. 26, 2002   (FR) ................................. 02 03743

(51) Int. Cl.
*H04L 9/06* (2006.01)
*H04K 1/00* (2006.01)
(52) U.S. Cl. ....................... 713/193; 713/164; 713/179; 380/28
(58) Field of Classification Search .................... None
See application file for complete search history.

(56) References Cited

U.S. PATENT DOCUMENTS

| 5,224,166 | A | 6/1993 | Hartman |
| 5,892,826 | A | 4/1999 | Brown |
| 6,385,727 | B1 * | 5/2002 | Cassagnol et al. ............ 713/193 |
| 6,438,666 | B2 * | 8/2002 | Cassagnol et al. ............ 711/163 |
| 6,901,385 | B2 * | 5/2005 | Okamoto et al. ............... 705/51 |
| 7,082,615 | B1 * | 7/2006 | Ellison et al. ................. 726/26 |
| 7,124,302 | B2 * | 10/2006 | Ginter et al. ................. 713/189 |
| 7,380,278 | B2 * | 5/2008 | Ellison et al. ................. 726/26 |
| 7,430,585 | B2 * | 9/2008 | Sibert .......................... 709/216 |
| 7,437,574 | B2 * | 10/2008 | Ronkka et al. ............... 713/194 |
| 2002/0129245 | A1 * | 9/2002 | Cassagnol et al. ............ 713/168 |
| 2005/0125681 | A1 * | 6/2005 | Bressy et al. ................. 713/189 |
| 2005/0259813 | A1 * | 11/2005 | Wasilewski et al. ........... 380/28 |
| 2005/0262342 | A1 * | 11/2005 | Field ........................... 713/165 |

(Continued)

FOREIGN PATENT DOCUMENTS

EP   0 308 219   3/1989

(Continued)

*Primary Examiner*—Christopher A Revak
(74) *Attorney, Agent, or Firm*—Young & Thompson (57) ABSTRACT

A method for automatic validation of a computer program can access a secure memory and a non-secure memory, the program using at least one coding function and at least one de-coding function. The method includes a verification step (E340) during which verification occurs to ensure that each function which is adapted in order to read data from the secure memory and to produce data in the non-secure memory is a coding function and that all data produced by the coding function is stored in the secure memory.

21 Claims, 3 Drawing Sheets

U.S. PATENT DOCUMENTS

| | | | |
|---|---|---|---|
| 2006/0015748 A1* | 1/2006 | Goto et al. | 713/190 |
| 2006/0080553 A1* | 4/2006 | Hall | 713/189 |
| 2007/0006294 A1* | 1/2007 | Hunter | 726/14 |
| 2007/0061581 A1* | 3/2007 | Holtzman et al. | 713/176 |
| 2007/0288765 A1* | 12/2007 | Kean | 713/193 |
| 2008/0295180 A1* | 11/2008 | Yoneda | 726/27 |
| 2008/0298581 A1* | 12/2008 | Murase et al. | 380/44 |
| 2008/0301440 A1* | 12/2008 | Plouffe et al. | 713/164 |
| 2008/0301468 A1* | 12/2008 | Murase et al. | 713/193 |
| 2008/0301469 A1* | 12/2008 | Plouffe et al. | 713/193 |

FOREIGN PATENT DOCUMENTS

| | | |
|---|---|---|
| FR | 2 796 175 | 1/2001 |
| WO | 01/54083 | 7/2001 |
| WO | WO 03/058409 A2 * | 7/2003 |

\* cited by examiner

| Identifier | Argument 1 | | Argument 2 | | Argument 3 | |
|---|---|---|---|---|---|---|
| DES | INPUT | 8 | KEY | L | OUTPUT | 8 |
| CHECKSUM_XOR | INPUT | 8 | OUTPUT | 8 | /////// | /// |
| DES -1 | INPUT | 8 | KEY | L | OUTPUT | 8 |

| Identifier | READ | WRITE |
|---|---|---|
| DES | MS | MS |
| DES | MS | MNS |
| DES | MNS | MS |
| DES | MNS | MNS |
| CHECKSUM_XOR | MNS | MS |
| CHECKSUM_XOR | MS | MS |
| CHECKSUM_XOR | MNS | MNS |
| DES-1 | MNS | MS |
| DES-1 | MS | MS |

METHOD AND DEVICE FOR AUTOMATIC VALIDATION OF COMPUTER PROGRAM USING CRYPTOGRAPHY FUNCTIONS

The present invention relates to a method and a device for automatic validation of a computer program.

The present invention is directed more particularly to a method for automatic validation of a computer program able to access secure memory and non-secure memory and using at least one encryption function and at least one decryption function.

The invention finds an advantageous but non-limiting use in the customization of microcircuit cards.

The customization of microcircuit cards includes steps of processing sensitive data, i.e. secret data that is to be protected from fraudulent manipulation. This is known in the art.

For example, this kind of processing may consist in the following successive operations:
  receiving encrypted input data;
  decrypting the encrypted data using a secret key, the result of this decrypting operation being first sensitive data;
  applying a logic operation, for example a shift, to the first sensitive data to obtain second sensitive data; and
  encrypting the second sensitive data using a second secret key.

In the field of customization of microcircuit cards, various solutions are known in the art for carrying out such processing and for preserving the sensitive data obtained during processing from fraudulent manipulation.

A first solution known in the art consists in fabricating a dedicated microcircuit card known as the "root card" and implementing the various operations cited above.

The use of a root card of the above kind achieves total security, the data being temporarily archived, for its manipulation, in an internal secure memory of the microcircuit card.

Unfortunately, a root card is able to perform only the process for which it was developed.

It follows that to implement a new process, it is necessary to develop a dedicated card mask adapted to that process, necessitating non-negligible costs and development time.

In order to alleviate this problem, the person skilled in the art of customizing microcircuit cards sometimes makes use, in a manner that is known in the art, of secure platforms adapted to perform different types of processing on sensitive data.

These platforms may comprise secure computer systems or dedicated electronic cards.

In the present context, the execution of a particular process comprises a first phase of specifying and developing software implementing the various operations of the process taking account of the specific characteristics of the secure platforms.

During a second phase, the software developed in this way is verified manually by specialists in the platforms concerned to verify that no sensitive data can be accessed by third parties having fraudulent intent during the process.

Although more flexible than using a root card, this second solution also necessitates relatively long development times, in particular because of the phase of manual verification of the program by a specialist company.

The present invention solves the problems cited above.

The present invention consists more particularly in a method of automatic validation of a computer program able to access secure memory and non-secure memory and using at least one encryption function and at least one decryption function; this validation method comprises a verification step which verifies that:
  any function adapted to read data from said secure memory and to produce data in said non-secure memory is an encryption function; and
  any data produced by said decryption function is stored in said secure memory.

In the remainder of this document, a distinction is made between "secure memory", i.e. memory accessible only by a verifier program implementing the above validation method, and "non-secure memory" accessible in particular by a user of the verifier program or by other computer programs.

In a first embodiment, the secure and non-secure memories are distinct physical memories corresponding to different physical components.

In a preferred embodiment, the secure and non-secure memories are separate register areas of the same physical component, management and access control functions in respect of these memories being provided by software in a manner known to the person skilled in the art, for example by low-level memory management functions provided by a secure operating system.

The validation method is particularly advantageous since it may be used to validate any computer program using cryptographic functions, unlike the root card or the secure platform used in the prior art.

It verifies in particular that any function adapted to read data from secure memory and to produce data in non-secure memory is an encryption function, which ensures that only encrypted data is accessible to the user of the verifier program or to other computer programs.

The validation method of the invention also verifies that any data produced by the decryption function, in particular any sensitive data, is stored in secure memory.

According to a first feature, the computer program also uses at least one non-cryptographic function chosen from a logic function, a random number generation function, and an integrity check function.

The validation method may therefore validate any type of program using encryption functions, decryption functions and non-cryptographic functions.

According to one preferred feature of the invention, the computer program being in source code, the method comprises, before the verification step, a step of compilation of the source code into binary script, the verification step being effected on the binary script generated in this way.

This preferred embodiment achieves a higher level of security since it prevents fraudulent modification of the source code after the verification step.

The computer program is a sensitive data generation program, for example.

In a preferred embodiment, the computer program is a sensitive data transformation program. For example, it receives at its input first sensitive data, for example secure keys, effects decryption operations and logic operations on the first sensitive data and, following encryption, supplies other sensitive data, for example a secret code.

According to another and particularly advantageous feature, each function used by the computer program is associated with at least one operating mode that defines at least one rule governing access to secure and non-secure memory, the operating mode being stored in a verification table used during the verification step.

The above operating modes are used by programmers during the step of specifying and developing a particular process.

According to the invention, these rules in particular require any decryption function to store the data produced in secure memory.

A preferred embodiment of the validation method further comprises:
  a step of allocation of said secure memory and said non-secure memory;
  a step of loading into a working memory a verifier program for said binary script adapted to implement said verification step; and a step of loading said binary script into said working memory.

The above steps are executed by a main program which therefore defines the memory environment used by the verifier program for the verification of the binary script.

The invention therefore finds a use in the field of customizing microcircuit cards, but also in varied fields such as electronic transactions in telecommunication servers, for example.

The invention is also directed to a compiler implementing a validation method as briefly described hereinabove.

This kind of compiler may advantageously be used in a software microcircuit card personalization system.

The invention is also directed to a method of executing a computer program adapted to access secure memory and non-secure memory, the program using at least one encryption function and at least one decryption function.

Before executing each function, the execution method of the invention executes a verification step as briefly described hereinabove.

According to this execution method, before executing each function of the program, the verification step briefly described hereinabove is executed to verify that the function preserves the security of the sensitive data.

An execution method of this kind is particularly reliable since it prevents manipulation of the binary script between the verification of a function and its execution.

It may obviously be used to customize microcircuit cards.

More generally, it may be used to transform or generate sensitive data, for example, in the field of telecommunications, to generate keys in a telecommunication server.

Another aspect of the invention relates to an electronic integrated circuit adapted to implement a validation method or an execution method as briefly described hereinabove.

An integrated circuit of the above kind may be modeled in the language VHDL known to the person skilled in the art, for example.

It may also be implemented in the form of a programmable electronic component.

The invention is further directed to a microcircuit card and a computer system including an integrated electronic circuit as briefly described hereinabove.

Another aspect of the invention is directed to a secure operating system implementing a validation method as briefly described hereinabove.

An operating system of the above kind may be used with great advantage in the microcircuit card industry, as it enables security functions to be implemented at the lowest software level of the microcircuit cards, which prevents virtually all types of fraudulent operation.

In the field of microcircuit cards, an operating system of the above kind also secures the execution of loaded applications, including subsequent to the issuing of the cards (post-issuance).

The invention is also directed to a microcircuit card and a computer system including an operating system of the above kind.

The invention is further directed to a device for validating a computer program adapted to access secure memory and non-secure memory and using at least one encryption function and at least one decryption function.

The validation device comprises a verifier program adapted to verify that:
  any function adapted to read data from said secure memory and to produce data in said non-secure memory is an encryption function; and
  any data produced by said decryption function is stored in said secure memory.

The invention is further directed to a secure computer operating system comprising:

means for compiling a computer program in binary script;
means for loading said binary script into a working memory;
means for allocating secure memory and non-secure memory; and
a validation device as described briefly hereinabove.

The particular advantages and characteristics specific to the compiler, the execution method, the secure operating system, the microcircuit card, the validation device and the computer system being the same as those explained hereinabove in connection with the validation method of the invention, they will not be set out again here.

Other aspects and advantages of the present invention will become more clearly apparent on reading the following description of particular embodiments of the invention, the description being given by way of non-limiting example only and with reference to the appended drawings, in which.

Additionally, the description is accompanied by the following appendices:
  Appendix A: example of computer program adapted to be validated by a validation method of the present invention and to be executed by an execution method of the present invention;
  Appendix B: binary code obtained after compilation of the Appendix A computer program.

An example of a source code computer program P adapted to be validated by an automatic validation method of the present invention and to be executed by an execution method of the present invention is given in Appendix A.

This computer program P comprises a sequence of operations each implementing a decryption function, an encryption function or a non-cryptographic function.

Figure 1:
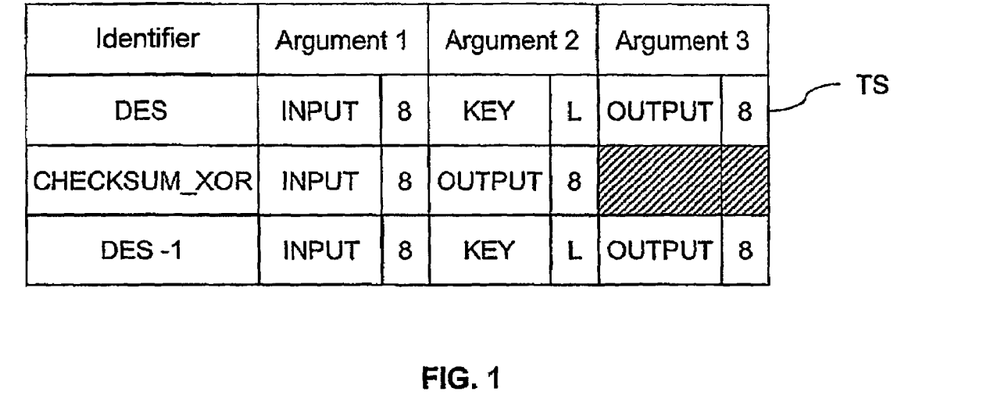
FIG. 1 represents a syntax table conforming to the present invention.

When developing this kind of computer program, the developer must, for each operation, conform to a syntax stored in a syntax table TS, one example of which is shown in FIG. 1.

To be more precise, each operation comprises:
an identifier of the function;
a list of arguments; and
a character representative of the end of the operation, for example the ";" character.

Accordingly, the first operation declared in line a1 is a decryption operation using a decryption function DES-1 identified by the identifier DES-1 and using three arguments:
  INPUT, address range of 8 bytes containing the data to be decrypted;
  KEY, reference to a cryptographic key, stored in the form of a string of L characters; and
  OUTPUT, address range of 8 bytes at which the result of the decryption function must be stored.

In the embodiment described above, the programmer advantageously does not know the cryptographic key, only its reference KEY in the form of a character string. This embodiment prevents fraud by the programmer.

Similarly, the second operation declared in line a2 is an integrity check operation using an integrity check function CHECKSUM_XOR identified by the identifier CHECKSUM_XOR and using two arguments:

INPUT, address range of 8 bytes containing the input data on which the logic function must operate; and OUTPUT, address on 8 bytes at which the result of the logic function must be stored.

Finally, the third operation declared in line a3 is an encryption operation using an encryption function DES identified by the identifier DES and using three arguments:

INPUT, address range of 8 bytes containing the data to be encrypted;

KEY, reference to a cryptographic key, stored in the form of a string of L characters; and OUTPUT, address range on 8 bytes at which the result of the encryption function must be stored.

Figure 2:
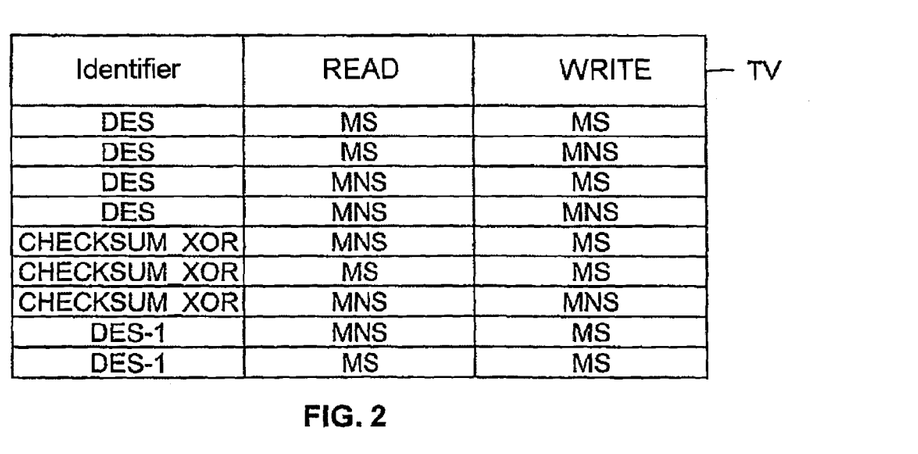
FIG. 2 represents a verification table conforming to the present invention.

Each function is further associated with an operating mode defining at least one memory access rule, the operating modes being stored in a verification table shown in FIG. 2.

FIG. 2 represents a verification table of the present invention.

For each encryption, decryption and logic function, the verification table TV comprises as many rows as there are operating modes for that function, each operating mode defining rules for access to secure memory MS and non-secure memory MNS.

For example, the encryption function DES comprises four operating modes because, in the embodiment described here, any encryption function is authorized to read and write secure and non-secure memory with no particular constraints.

On the other hand, the last two rows of the verification table TV show that the decryption function DES-1 has only two operating modes, the present invention authorizing a decryption function to produce data only in secure memory MS.

Figure 3:
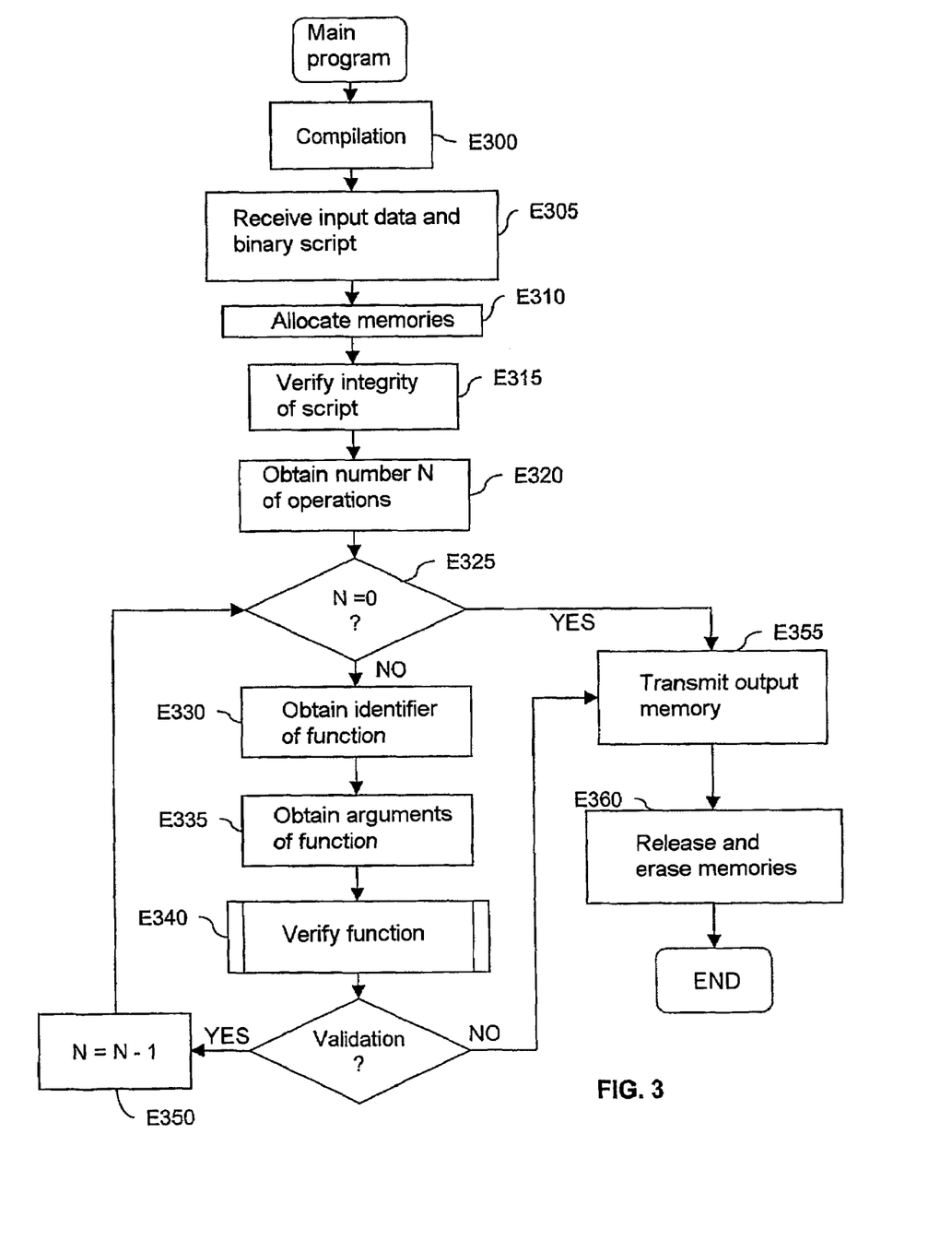
FIG. 3 represents a flowchart showing the main steps of a main program conforming to the present invention.

A main program implementing an automatic validation method and a method of executing a computer program P conforming to the present invention is described next with reference to FIG. 3.

The validation method comprises a preliminary step E300 of compiling the Appendix A computer program P, this compilation step generating a binary script EXE.

The binary script EXE resulting from this compilation step is described next with reference to Appendix B.

To simplify the description, the bytes of the binary script EXE are grouped into rows b1 to b20.

The first two bytes of the script EXE (row b1) correspond to the size of the binary script, which is 6C in hexadecimal notation.

The next byte (row b2) corresponds to the number of operations in the computer program P, that is to say three operations.

The bytes grouped in rows b3 to b8 are generated by the compilation of the first operation (row a1, Appendix A).

Similarly, the bytes grouped in rows b9 to b13 are generated by the compilation of the second operation (row a2, Appendix A).

Finally, the bytes grouped in rows b14 to b19 are generated by the compilation of the third and final operation (row a3, Appendix A).

In each of the above groups:

the first row (rows b3, b16 and b14) comprises a byte representing in hexadecimal notation the number of bytes generated by the compilation of the corresponding operation, that is to say 24, 16 and 24 for the functions DES-1, CHECKSUM_XOR and DES, respectively;

the second row (rows b4, b10 and b15) comprises a byte generated by the compilation of the identifier of the corresponding function, that is to say 22, 53 and 21 for the functions DES-1, CHECKSUM_XOR and DES, respectively;

the third row comprises one byte (rows b5, b11 and b16) equal to the number of arguments of the corresponding function, namely 3, 2 and 3 for the functions DES-1, CHECKSUM_XOR and DES, respectively;

the fourth row (rows b6, b12 and b17) comprises the bytes generated by the compilation of the first argument of the corresponding function;

the fifth row (rows b7, b13 and b18) comprises the bytes generated by the compilation of the second argument of the corresponding function; and the sixth row (rows b8 and b19) comprises, where applicable, the bytes generated by the compilation of the third argument of the corresponding function.

In the embodiment described here, the compilation of an argument first generates a first byte representative of the memory area in which the read or write operation effected on that argument must be done.

Four memory areas are used in the example described here:

a non-secure input area IN_BUF represented by the byte 01 (row b6);

a non-secure output area OUT_BUF represented by the byte 02 (row b19);

a secure calculation area PRIVATE represented by the byte 04 (rows b8, b12 and b13); and a secure key storage area represented by the byte 05 (rows b7 and b18).

The compilation of an argument then generates a second byte representative of the size of the argument. In the present example, this size is either 8 bytes when the argument is an address or 12 bytes (0C in hexadecimal notation) when the argument is the key KEY constituted of the 12 characters "CIPHER.TEST1".

The compilation of an argument finally generates a group of bytes representative of the value of the argument concerned.

In the present embodiment, an address range is represented in the program P using the notation ZONE/SHIFT/LENGTH, where:

ZONE represents the type of memory zone containing this address range, the type being chosen from non-secure input zone IN_BUF, non-secure output zone OUT_BUF, secure calculation zone PRIVATE, and secure key storage zone;

SHIFT represents the offset of the beginning of this address range relative to the beginning of the zone; and LENGTH represents the size of the address range.

Using the above notation, the second argument (OUTPUT=[PRIVATE/08/01]) of the logic operation CHECKSUM_XOR (row a2, Appendix A), signifies that the result of the logic operation must be stored in the secure calculation zone PRIVATE, in a range extending over one byte, starting from the eighth byte of that zone.

In the present embodiment, the binary script ends with a series of bytes (row b20) corresponding to a cryptographic signature obtained from at least some of the bytes constituting the script.

The compilation step E300 is followed by a step E305 during which the main program receives:

input data from the computer program P, which may include secure keys; and the binary script EXE generated during the compilation step E300.

In the present embodiment, the secure keys are stored in the secure key storage area.

The reception step E305 is followed by a step E310 during which the main program dynamically allocates secure memory MS and non-secure memory MNS.

This allocation step is known to the person skilled in the art and may be carried out using the system function malloc ( ), for example.

Be this as it may, the allocation step E310 produces a first address pointer BUFF_MNS pointing to the non-secure memory and a second address pointer BUFF_MS pointing to the secure memory.

In the embodiment described here, the non-secure memory MNS allocated in this way is divided into two areas:
the non-secure input area IN_BUF; and
the non-secure output area OUT_BUF.

The secure memory MS is also divided into two areas:
the secure calculation area PRIVATE; and
the secure key storage area.

In a preferred embodiment, during the same step E310 a working memory MT marked by the pointer BUFF_EXE and comprising the binary script EXE received during the step E305 is also allocated.

The memory allocation step E310 is followed by a step E315 of verifying the integrity of the binary script.

The step E315 may be effected by verifying the cryptographic signature of the binary script EXE, for example, as described above with reference to row b20 of Appendix B.

This optional step E315 of verifying the integrity of the script makes the validation method more secure.

The optional step E315 of verifying the integrity of the script is followed by a step E320 during which the number N of operations of the computer program P is obtained and stored in a register of the working memory MT with the same name.

In the present embodiment, the number N of operations is the third byte (row b2) of the binary script EXE.

If the optional step E315 of verifying the integrity of the script is not implemented, the step E320 of obtaining the number of operations follows on from the step E310 of allocating memories described above.

The step E320 of obtaining the number N of operations is followed by a test E325 which verifies if the content of the register N of the working memory MT is equal to 0.

If not, the result of the test E325 is negative.

This test is then followed by a step E330 during which the function identifier used by the first operation of the computer program P is obtained in the binary script.

In the Appendix B example, the identifier obtained in this way is the identifier 22, representing the function DES-1 (row b4).

This step E330 is followed by a step E335 during which the arguments of this function are obtained in the binary script.

In practice, the step E335 of obtaining the arguments comprises:
a first sub-step during which the list and the size of each of the arguments of the function is looked up in the syntax table TS from FIG. 1; and
a second sub-step during which the number of bytes corresponding in the binary script is read.

The step E335 of obtaining the arguments of the function is followed by a step E340 of invoking a procedure for verifying the function identified during the steps E330 and E335.

Figure 4:
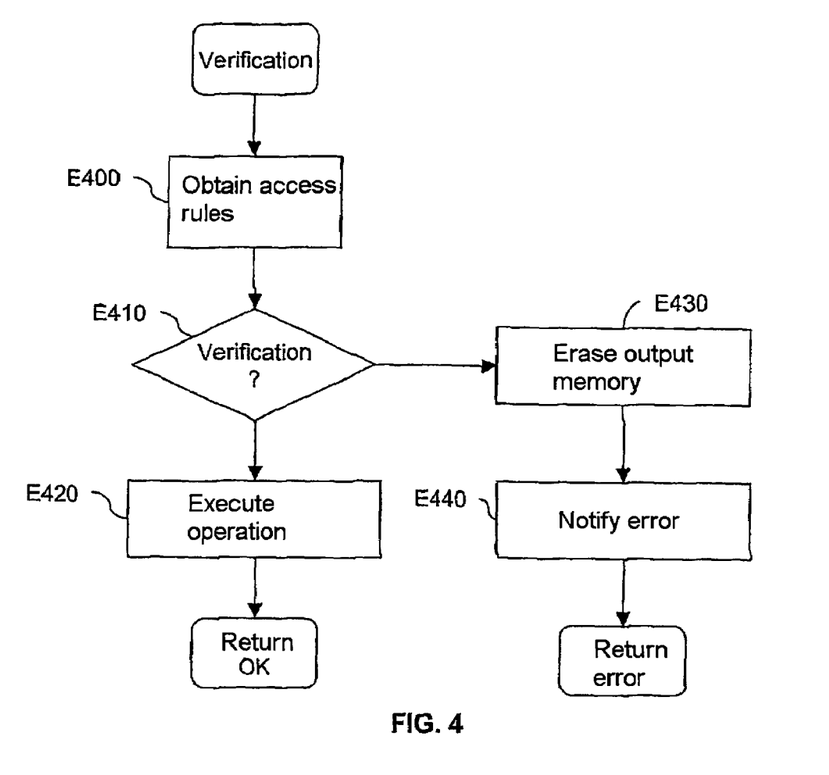
FIG. 4 represents a flowchart showing the main steps of a verification procedure conforming to the present invention.

The main steps E400 to E440 of the verification procedure are described next with reference to FIG. 4.

During the first step E400 of the verification procedure, the rules governing access to secure and non-secure memory are obtained from the FIG. 2 verification table, these rules being defined in the operating mode of the function identified in the step E330.

The step E400 of obtaining the rules is followed by a test E410 which verifies if these access rules are complied with.

In practice, this verification step verifies that:
all the read and write operations to be effected in a secure memory under these rules are effected in the address range to which the pointer BUFF_MS points; and
all the write and read operations to be done in the non-secure memory are effected in the address range to which the pointer BUFF_MNS points.

For example, scanning rows b14 to b19 of appendix B identifies that the function DES (row b15) effects:
an operation of reading the range consisting of the first nine bytes of the secure calculation area PRIVATE (byte 04, row b17); and
an operation of writing in the range consisting of the first ten bytes of the non-secure output area OUT_BUF (byte 02, row b19), these memory access operations conforming to the second operating mode of the function DES and the verification table TV.

If all the memory access rules are complied with, the result of the test E410 is positive.

This test is then followed by the step E420 during which the operation being processed is executed.

On the other hand, if one or more access rules are not complied with, the result of the test E410 is negative.

The test is then followed by a step E430 during which the content of the non-secure output area OUT_BUF is deleted.

The step E430 of deleting the output memory is followed by a step E440 of notifying an error to the programmer of the computer program P.

Be this as it may, the steps E420 and E440 terminate the verification procedure of the invention.

These steps are followed by a validation test E345 described next with reference to FIG. 3.

The validation test E345 verifies if the verification procedure described above with reference to FIG. 4 terminated at the execution of the operation (step E420) or at a step of error notification (step E440).

If the verification procedure terminates normally, i.e. with the operation execution step E420, the result of the test E345 is positive.

The test is then followed by a step E350 during which the content of the register N is decremented by one unit.

The step E350 is followed by the test E325 described above, which verifies if the register N contains the value 0.

If the result of this test is negative, the step E330 described above is executed during which the identifier of the function constituting the second operation of the computer program P is read in the binary script EXE.

Thus the steps E325 to E350 constitute a loop during which all operations of the program are validated and executed if the computer program P complies with all the memory access rules.

On the other hand, if the verification procedure terminates in an error notification, the result of the test E345 is negative.

The test is then followed by the step E355 described hereinafter.

If all the operations of the computer program P have been validated by the loop comprising the steps E325 to E350, the result of the test E325 is positive.

In this case, the test E325 is followed by a step E355 during which the content of the output area OUT_BUF is transmitted either to the user of the main program or to another output data processing computer program.

The step E355 is followed by a step E360 of releasing and erasing the memories allocated in the step E310.

This step E310 terminates the main program conforming to the present invention.

Figure 5:
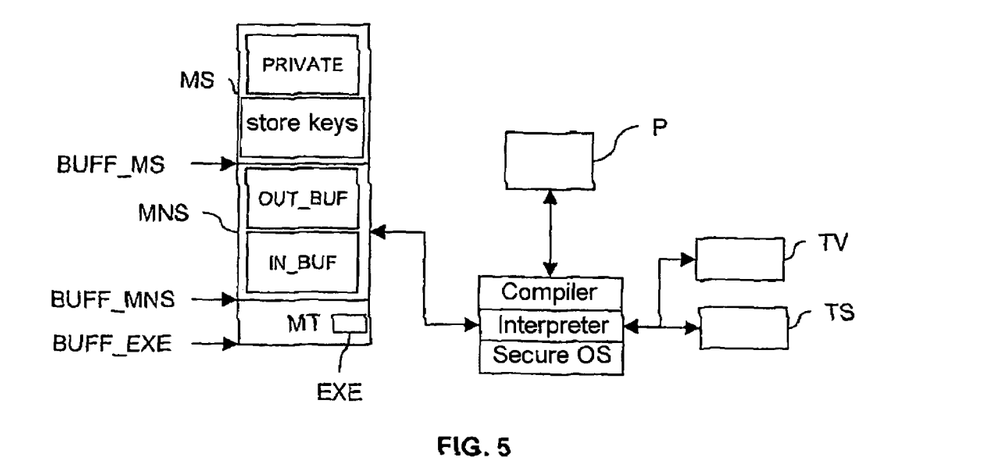
FIG. 5 represents a computer system including a validation device conforming to the present invention.

FIG. 5 shows diagrammatically a computer system including a validation device conforming to the present invention.

This computer system comprises a compiler for generating a binary script EXE as described above from a source code computer program P.

The computer system further comprises a secure operating system which comprises means for allocating secure memory MS and non-secure memory MNS.

In a preferred embodiment, these allocation means are in practice software functions known to the person skilled in the art, for example the function malloc ( ). This allocation function returns an address pointer delimiting the beginning of the address ranges of the secure memory MS and the non-secure memory MNS. This is known in the art.

In the FIG. 5 example, the address pointers of the secure memory MS and the non-secure memory MNS are the pointers BUFF_MS and BUFF_MNS, respectively.

In a preferred embodiment, the binary script EXE is contained in a working memory MT allocated by the allocation means cited above and marked by the address pointer BUFF_EXE.

In the present embodiment, the binary script EXE is in practice loaded into the working memory by loading means of the computer system, for example a PCI bus.

In a different embodiment, the binary script EXE is stored in non-volatile memory and loaded at the time it is validated.

Thus the computer system comprises a validation device comprising a verifier program adapted to verify the validity of the binary script EXE.

The verifier program of the computer system is generally adapted to implement the validation method and the execution method described above with reference to FIGS. 3 and 4.

To be more precise, the verifier program is adapted to verify that any function adapted to read data from secure memory MS and to produce data in non-secure memory MNS is an encryption function.

It is also adapted to verify that any data produced by a decryption function is stored in secure memory MS.

The verifier program is in particular adapted to scan the binary script EXE stored in the working memory MT, to mark the instructions corresponding to the identifiers and to the arguments of the encryption, decryption and logic functions after compilation.

This marking step is effected by comparing the hexadecimal data of the binary script EXE with the information contained in the syntax table TS described above with reference to FIG. 1.

The verifier program of the computer system is adapted, when these function arguments and identifiers have been marked, to verify compliance with the access rules stored in the verification table TV described above with reference to FIG. 2.

To this end, and for each memory read or write operation, it marks in the binary script EXE the memory address at which the operation must be carried out.

It then determines if the operation should take place in secure memory MS or in non-secure memory MNS by comparing the address for the operation with the values of the address pointers BUFF_MS and BUFF_MNS.

Once the memories type has been identified, the verifier program of the computer system verifies that the write or read operation conforms to the access rules for the type of function being processed.

In a different embodiment, the validation method is implemented at the level of the secure operating system. A secure operating system may advantageously be used in a microcircuit card.

APPENDICES

APPENDIX A

/*a1*/ DES-1 (INPUT = [IN_BUF/00/08], KEY="CIPHER.TEST1", OUTPUT= [PRIVATE/00/08] );

/*a2*/ CHECKSUM_XOR (INPUT = [PRIVATE/00/08], OUTPUT = [PRIVATE/08/01]);

/*a3*/ DES (INPUT = [PRIVATE/00/09], KEY="CIPHER.TEST1", OUTPUT = [OUT_BUFF/00/10] );

APPENDIX B

| | | | |
|---|---|---|---|
| /*b1*/ | 006C | | /* script size */ |
| /*b2*/ | 03 | | /* number of operations */ |
| /*b3*/ | 24 | | /* DES-1 instruction size */ |
| /*b4*/ | 22 | | /* DES-1 instruction identifier */ |
| /*b5*/ | 03 | | /* number of arguments */ |
| /*b6*/ | 01 | 08 0000000000000008 | /* INPUT */ |
| /*b7*/ | 05 | 0C 4349504845522 E5445535431 | /* KEY */ |
| /*b8*/ | 04 | 08 0000000000000008 | /* OUTPUT */ |
| /*b9*/ | 16 | | /* CHECKSUM_XOR instruction size */ |
| /*b10*/ | 53 | | /* CHECKSUM_XOR instruction identifier */ |
| /*b11*/ | 02 | | /* number of arguments */ |
| /*b12*/ | 04 | 08 0000000000000008 | /* INPUT */ |
| /*b13*/ | 04 | 08 0000000800000001 | /* OUTPUT */ |
| /*b14*/ | 24 | | /* DES instruction size */ |
| /*b15*/ | 21 | | /* DES instruction identifier */ |
| /*b16*/ | 03 | | /* number of arguments */ |
| /*b17*/ | 04 | 08 0000000000000009 | /* INPUT */ |
| /*b18*/ | 05 | 0C 4349504845522E5445535431 | /* KEY */ |
| /*b19*/ | 02 | 08 0000000000000010 | /* OUTPUT */ |
| /*b20*/ | 1425283678895422 | | /* cryptographic signature */ |

The invention claimed is:

1. A method of automatic validation of a computer program able to access secure memory (MS) and non-secure memory (MNS), the program using at least one encryption function (DES) and at least one decryption function (DES-1), comprising a verification step (E340) which verifies that:
   any function adapted to read data from said secure memory (MS) and to produce data in said non-secure memory (MNS) is an encryption function; and
   any data produced by said decryption function is stored in said secure memory (MS).

2. The method of automatic validation according to claim 1, wherein said program also uses at least one non-cryptographic function, said non-cryptographic function being chosen from a logic function, a random number generation function and an integrity check function.

3. The method of automatic validation according to claim 2, wherein any data produced by said non-cryptographic function from data read in said secure memory (MS) is stored in said secure memory (MS).

4. The method of automatic validation method according to claim 1, wherein, the computer program being in source code, the method comprises, before said verification step (E340), a step (E300) of compilation of said source code into binary script (EXE), said verification step (E340) being effected on the binary script (EXE) generated in this way.

5. The method of automatic validation according to claim 1, wherein said computer program is a sensitive data generation program.

6. The method of automatic validation according to claim 1, wherein said computer program is a sensitive data transformation program.

7. The method of automatic validation according to claim 1, wherein each function used by said computer program is associated with at least one operating mode that defines at least one rule governing access to said memories, said operating mode being stored in a verification table (TV) used during said verification step (E340).

8. The method of automatic validation according to claim 7, comprising:
   a step (E310) of allocation of said secure memory (MS) and said nonsecure memory (MNS);
   a step of loading into a working memory a verifier program for said binary script (EXE), said verifier program being adapted to implement said verification step (E340); and
   a step (E305) of loading said binary script (EXE) into said working memory.

9. A compiler wherein it is adapted to implement a validation method according to claim 1.

10. A method of executing a computer program adapted to access secure memory (MS) and non-secure memory (MNS), the program using at least one encryption function (DES) and at least one decryption function (DES-1), comprising: a verification step (E340) conforming to claim 1 is executed before the execution (E420) of each function of said program.

11. A use of the execution method according to claim 10 to transform or generate sensitive data.

12. A use of the execution method according to claim 10 to customize microcircuit cards.

13. An integrated electronic circuit wherein it is adapted to implement a validation method according to claim 1.

14. A microcircuit card comprising: an integrated electronic circuit according to claim 13.

15. A computer system comprising an electronic integrated circuit according to claim 13.

16. A secure operating system adapted to implement a validation method according to claim 1.

17. A microcircuit card comprising: an operating system according to claim 16.

18. A computer system comprising: an operating system according to claim 16.

19. A device for validating a computer program adapted to access secure memory (MS) and nonsecure memory (MNS), the program using at least one encryption function (DES) and at least one decryption function (DES-1), comprising: a verifier program adapted to verify that:
   any function adapted to read data from said secure memory (MS) and to produce data in said nonsecure memory (MNS) is an encryption function; and
   any data produced by said decryption function is stored in said secure memory (MS).

20. A validation device according to claim 19, wherein the verifier program is adapted to effect said verifications on the basis of a binary script (EXE) obtained by compilation of said computer program.

21. A computer system comprising a secure operating system comprising:
   means for compiling a computer program in binary script (EXE);
   means for loading said binary script (EXE) into a working memory;
   means for allocating secure memory (MS) and non-secure memory (MNS); and
   a validation device according to claim 19.

* * * * *

UNITED STATES PATENT AND TRADEMARK OFFICE
CERTIFICATE OF CORRECTION

PATENT NO. : 7,627,768 B2 Page 1 of 1
APPLICATION NO. : 10/509067
DATED : December 1, 2009
INVENTOR(S) : Finkelstein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1232 days.

Signed and Sealed this

Twenty-first Day of December, 2010

David J. Kappos
*Director of the United States Patent and Trademark Office*